United States Patent
Veverka

(10) Patent No.: US 11,132,872 B2
(45) Date of Patent: Sep. 28, 2021

(54) LOTTERY TICKET

(71) Applicant: TMS GLOBAL SERVICES PTY LTD, Brisbane (AU)

(72) Inventor: Mike Veverka, Brisbane (AU)

(73) Assignee: TMS GLOBAL SERVICES PTY LTD, Toowong Qld (AU)

( * ) Notice: Subject to any disclaimer, the term of this patent is extended or adjusted under 35 U.S.C. 154(b) by 0 days.

(21) Appl. No.: 16/701,010

(22) Filed: Dec. 2, 2019

(65) Prior Publication Data

US 2020/0105089 A1   Apr. 2, 2020

Related U.S. Application Data

(63) Continuation of application No. 14/417,605, filed as application No. PCT/AU2013/000835 on Jul. 26, 2013, now abandoned.

(30) Foreign Application Priority Data

Jul. 27, 2012   (AU) .................................. 2012903245

(51) Int. Cl.
| | |
|---|---|
| G07F 17/32 | (2006.01) |
| A63F 9/10 | (2006.01) |
| A63F 3/06 | (2006.01) |
| G06Q 50/00 | (2012.01) |
| G06Q 30/06 | (2012.01) |
| G07C 15/00 | (2006.01) |

(52) U.S. Cl.
CPC .............. *G07F 17/329* (2013.01); *A63F 3/06* (2013.01); *A63F 3/0605* (2013.01); *A63F 3/065* (2013.01); *A63F 9/10* (2013.01); *G07F 17/3218* (2013.01); *G07F 17/3248* (2013.01); *G07F 17/3281* (2013.01); *G06Q 30/06* (2013.01); *G06Q 50/01* (2013.01); *G07C 15/006* (2013.01)

(58) Field of Classification Search
CPC .......... A63F 3/06; A63F 3/065; A63F 3/0605; A63F 3/0655; A63F 9/10; G07F 17/329; G07F 17/3248; G07F 17/3281; G07F 17/3218
See application file for complete search history.

(56) References Cited

U.S. PATENT DOCUMENTS

| | | | | |
|---|---|---|---|---|
| 5,327,485 A | * | 7/1994 | Leaden .................. | G06Q 50/34 379/903 |
| 5,354,069 A | * | 10/1994 | Guttman .............. | G07C 15/006 273/269 |

(Continued)

FOREIGN PATENT DOCUMENTS

| | | |
|---|---|---|
| WO | WO 2003/030114 A2 | 4/2003 |
| WO | WO 2014/015387 A1 | 1/2014 |

OTHER PUBLICATIONS

Australian Patent Office, "Written Opinion" in application No. PCT/AU2013/000835, dated Oct. 2, 2013, 1 page.

(Continued)

*Primary Examiner* — William H McCulloch, Jr.
(74) *Attorney, Agent, or Firm* — Hickman Becker Bingham Ledesma LLP

(57) ABSTRACT

The present invention is directed to a lottery ticket. The lottery ticket includes a matching identifier for matching with identifiers of one or more other lottery tickets to form a winning combination of lottery tickets.

11 Claims, 5 Drawing Sheets

(56) References Cited

U.S. PATENT DOCUMENTS

| | | | | |
|---|---|---|---|---|
| 5,772,511 | A * | 6/1998 | Smeltzer | A63F 3/081 463/17 |
| 6,227,969 | B1 | 5/2001 | Yoseloff | |
| 8,313,371 | B1 * | 11/2012 | Luciano, Jr. | G07F 17/3255 463/25 |
| 9,830,779 | B2 * | 11/2017 | Veverka | G07F 17/329 |
| 10,282,936 | B2 * | 5/2019 | Barnes | G06Q 20/047 |
| 10,943,432 | B2 * | 3/2021 | Cage | G07F 17/3237 |
| 10,950,085 | B2 * | 3/2021 | Bennett, III | G07F 17/3225 |
| 2002/0077174 | A1 * | 6/2002 | Luciano | G07F 17/32 463/25 |
| 2002/0094871 | A1 * | 7/2002 | Luciano, Jr. | G07F 17/32 463/43 |
| 2002/0160825 | A1 * | 10/2002 | Nicastro | G07F 17/3262 463/16 |
| 2006/0043669 | A1 | 3/2006 | Gumina | |
| 2006/0261546 | A1 * | 11/2006 | Payne | A63F 3/0605 273/139 |
| 2008/0085763 | A1 * | 4/2008 | Randhawa | G07F 17/329 463/25 |
| 2011/0227329 | A1 * | 9/2011 | Frost | A63F 3/0665 283/100 |
| 2011/0273329 | A1 | 9/2011 | Frost | |
| 2012/0202573 | A1 * | 8/2012 | Stanek | G07F 17/3267 463/17 |
| 2013/0231987 | A1 * | 9/2013 | Veverka | G06Q 30/0212 705/14.14 |
| 2014/0045569 | A1 * | 2/2014 | Veverka | G07F 17/329 463/18 |
| 2014/0045585 | A1 * | 2/2014 | Luciano, Jr. | G07F 17/3244 463/25 |
| 2015/0081414 | A1 * | 3/2015 | Veverka | G06Q 20/3274 705/14.25 |
| 2015/0170457 | A1 * | 6/2015 | Veverka | A63F 3/065 463/17 |
| 2015/0258451 | A1 * | 9/2015 | Veverka | G07F 17/3262 463/10 |
| 2015/0339741 | A1 * | 11/2015 | Veverka | G07F 17/3272 705/26.2 |
| 2016/0104346 | A1 * | 4/2016 | Ovalle | G07F 17/3209 463/17 |
| 2020/0105089 | A1 * | 4/2020 | Veverka | G07C 15/006 |
| 2020/0294362 | A1 * | 9/2020 | Hamman | G07F 17/329 |
| 2021/0121772 | A1 * | 4/2021 | Audi | G07F 17/326 |
| 2021/0166519 | A1 * | 6/2021 | Heathcote | G07F 17/3223 |

OTHER PUBLICATIONS

Australian Patent Office, "Search Report" in application No. PCT/AU2013/000835, dated Oct. 2, 2013, 5 pages.

Veverka, U.S. Appl. No. 14/417,605, filed Jan. 27, 2015, Office Action, dated Mar. 22, 2017.

Veverka, U.S. Appl. No. 14/417,605, filed Jan. 27, 2015, Final Office Action, dated Oct. 26, 2017.

* cited by examiner

LOTTERY TICKET

BENEFIT CLAIM

This application claims the benefit under 35 U.S.C. § 120 as a continuation of application Ser. No. 14/417,605, filed Jan. 27, 2015, which is a United States national stage filing under 35 U.S.C. § 371 of PCT international application PCT/AU2013/000835, having an international filing date of Jul. 26, 2013, which claims the benefit of Australia application 2012903245, filed Jul. 27, 2012, the entire contents of which are hereby incorporated by reference for all purposes as if fully set forth herein.

TECHNICAL FIELD

The present invention relates to a lottery ticket.

BACKGROUND ART

Conventional lottery tickets include a plurality of numbers for selection by a player for participation in a lottery prize draw. Once the winning lottery numbers are drawn, the player compares his selected numbers with the winning lottery numbers and determines whether he is eligible to redeem his lottery ticket for a prize. If the lottery ticket cannot be used to redeem a prize, the lottery ticket is simply discarded and another lottery ticket is purchased if the player wishes to participate in another lottery prize draw. In reality, the chance of winning a lottery prize is small, which discourages some people from purchasing lottery tickets.

It is an object of the invention to encourage more people to purchase lottery tickets.

It will be clearly understood that, if a prior art publication is referred to herein, this reference does not constitute an admission that the publication forms part of the common general knowledge in the art in Australia or in any other country.

SUMMARY OF INVENTION

According to one aspect of the invention, there is provided a lottery ticket including a matching identifier for matching with identifiers of one or more other lottery tickets to form a winning combination of lottery tickets.

Advantageously, a player can collect the winning combination of lottery tickets to participate in a second chance prize draw.

The lottery ticket may be a card. The card may be sized to fit in a wallet.

The matching identifier may be an image for matching with images of one or more other lottery tickets to meet one or more predetermined criteria. In one example, the matching identifier may be a partial image for matching with other partial images to form a winning complete image.

The matching identifier may be located on one side of the lottery ticket.

According to another aspect of the invention, there is provided a gaming system including a ticketing module for providing a lottery ticket to a player, the lottery ticket including a matching identifier for matching with identifiers of one or more other lottery tickets to form a winning combination of lottery tickets.

The ticketing module may generate a digital representation of a lottery ticket suitable for display on a desktop or handheld computer.

The gaming system may include a lottery module for determining whether the lottery ticket is a winning lottery ticket based on a plurality of numbers selected by the player.

The gaming system may include a matching module for determining whether the player has a winning combination of lottery tickets based on the matching identifier of each lottery ticket collected by the player. The matching module may determine that there is a winning combination of lottery tickets if the respective identifiers of lottery tickets collected by the player meet a one or more predetermined criteria. In one example, the matching module may determine that there is a winning combination of lottery tickets if a predetermined number of lottery tickets including the same identifier are collected by the player. In another example, the matching module may determine that there is a winning combination of lottery tickets if the respective identifiers of lottery tickets collected by the player can be pieced together to form a complete image.

The gaming system may further include a search module for enabling the player to search for one or more lottery tickets that the player wishes to collect. The search module may search other player's lottery tickets for the one or more lottery tickets that the player wishes to collect. The search module may locate the one or more lottery tickets that the player wishes to collect and their respective owners. The gaming system may prompt the player to contact the one or more owners to initiate trading of lottery tickets.

The gaming system may further include a trading module for enabling different players to trade their lottery cards. Further, the chance of winning a second change prize draw also encourages the player to buy multiple lottery tickets.

The gaming system may further include a messaging module for enabling the player to send messages to other players. The messages may be email, SMS messages or some other electronic means. The messaging module may further allow the player to post messages online. For example, the messaging module may further allow the player to post messages on forums and social media websites, such as Facebook and Twitter. In particular, the messaging module may allow the player to post messages offering a trading of lottery tickets. For example, the messaging module may allow the player to post a message including the lottery tickets that the player wishes to collect and the lottery tickets that the player wishes to trade.

Advantageously, the gaming system encourages other potential players to participate in the game and trade lottery tickets with their friends.

The gaming system may further include a notifications module for sending notifications to the player. For example, the notifications module may notify the player of any one or more of the following: a winning combination of lottery cards, cards which the player must collect to form the winning combination, when a card that the player wishes to collect has been found, when another player has accepted a trade, when a trade of one or more lottery tickets between the player and one or more other players has been completed, and when the player strikes a win. Notifications may be electronic in the form of email, SMS or push notifications on a mobile device.

The gaming system may further include a payment module for receiving and processing payment from the player.

The gaming system may further include a prize module for allocating a prize to the player for a win. The prize module may allocate prize money to the player's account.

According to a further aspect of the invention, there is provided a method of playing a game, the method including determining that a lottery ticket has a matching identifier which matches identifiers of one or more other lottery tickets to form a winning combination of lottery tickets.

The step of determining may include determining whether the respective identifiers of lottery tickets collected by a player meet one or more predetermined criteria. In one example, the step of determining may include determining whether a predetermined number of lottery tickets including the same identifier have been collected by the player. In another example, the step of determining may include determining whether the respective identifiers of lottery tickets collected by the player can be pieced together to form a complete image.

The method may further include distributing lottery tickets, each lottery ticket including a matching identifier for matching with identifiers of other lottery tickets.

The method may further include, prior to the step of determining, determining whether a lottery ticket purchased by a player is a winning lottery ticket.

The method may further include notifying a player of a winning combination of lottery cards.

The method may further include receiving payment from a player. The method may further include allocating a prize to a player for a win.

Any of the features described herein can be combined in any combination with any one or more of the other features described herein within the scope of the invention.

The reference to any prior art in this specification is not, and should not be taken as an acknowledgement or any form of suggestion that the prior art forms part of the common general knowledge.

BRIEF DESCRIPTION OF DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows.

DESCRIPTION OF EMBODIMENTS

Figure 1A:
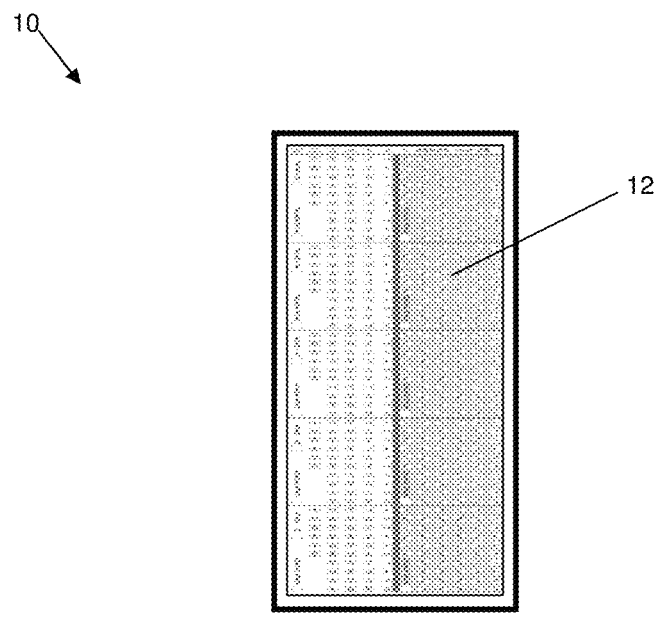
FIG. 1A illustrates the front face of a lottery ticket in accordance with an embodiment of the present invention.
Figure 1B:
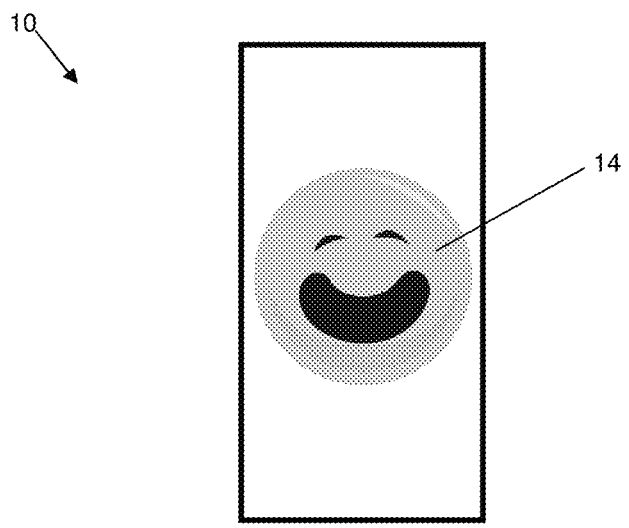
FIG. 1B illustrates the rear face of the lottery ticket of FIG. 1A.

FIGS. 1A and 1B illustrate a lottery ticket 10 in the form of a card that is sized to fit in a wallet. As shown in FIG. 1A, a front face of the lottery ticket 10 displays numbers 12 for selection by a player to participate in a lottery draw. As shown in FIG. 1B, a rear face of the lottery ticket 10 displays a matching identifier in the form of an image 14 for matching with images of one or more other lottery tickets to form a winning combination of lottery tickets.

Advantageously, a player can collect the winning combination of lottery tickets to participate in a second chance prize draw. A further benefit is that the player is encouraged to buy multiple lottery tickets to participate in the second chance prize draw.

Figure 2A:
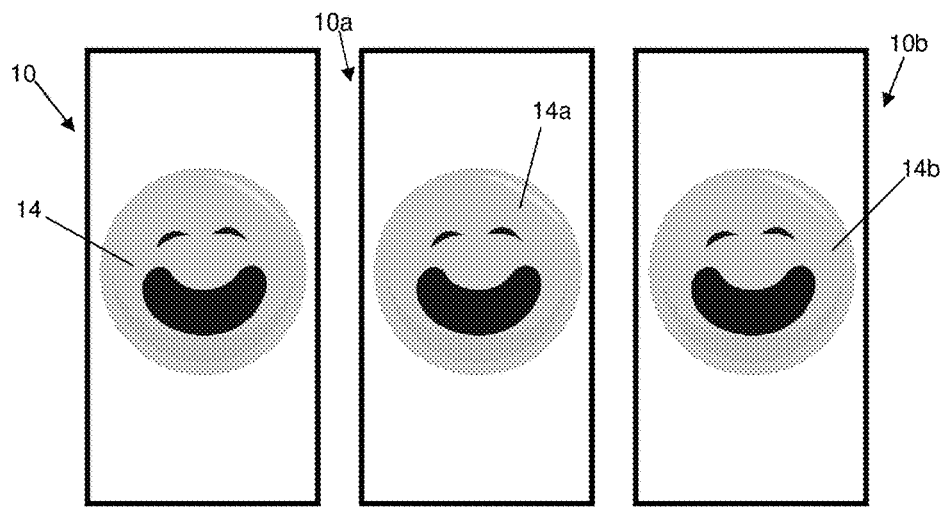
FIG. 2A illustrates an example winning combination of lottery tickets including the lottery ticket of FIGS. 1A and 1B.
Figure 2B:
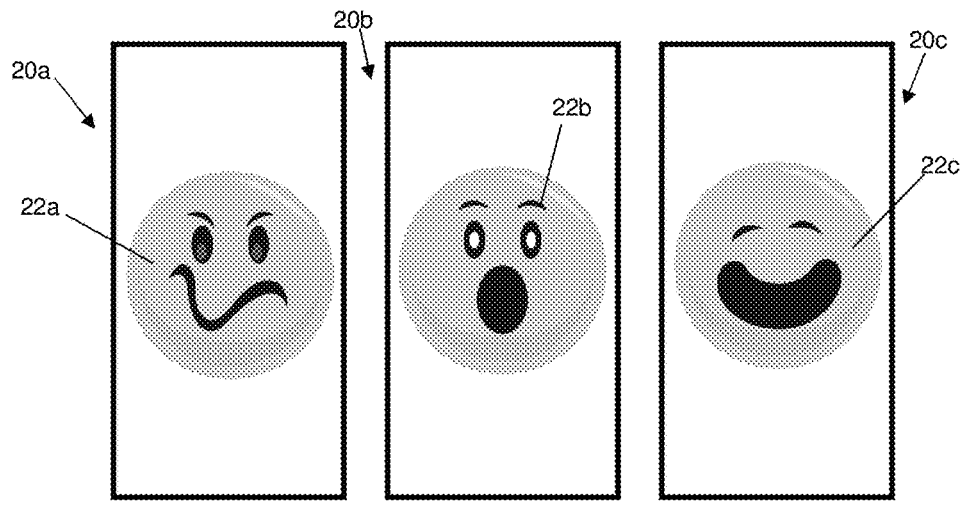
FIG. 2B illustrates another example winning combination of lottery tickets.
Figure 2C:
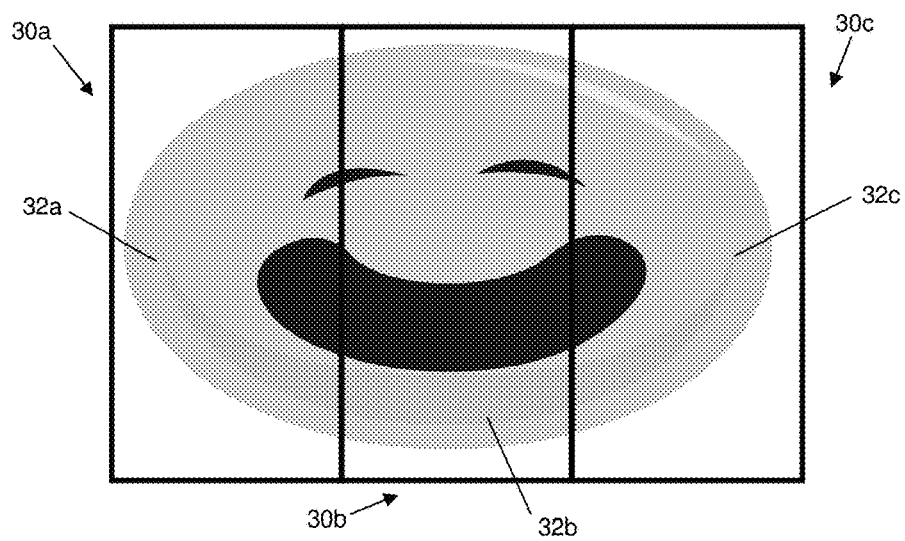
FIG. 2C illustrates a further example winning combination of lottery tickets.

FIGS. 2A to 2C illustrate some different types of possible winning combinations of lottery tickets. In one example as shown in FIG. 2A, three lottery tickets 10, 10a, 10b having identical images 14, 14a, 14b are collected to form a winning combination of lottery tickets. In another example as shown in FIG. 2B, three lottery tickets 20a, 20b, 20c, each having a different image 22a, 22b, 22c from a set of themed images are collected to form a winning combination of lottery tickets. In a further example as shown in FIG. 2C, three lottery tickets 30a, 30b, 30c, each having a partial image 32a, 32b, 32c are collected to form a complete image in a winning combination of lottery tickets.

In practice, more complex combinations may be required to form a winning combination of lottery tickets. For example, a player may be required to collect a predetermined number of subsets of lottery tickets based on specific gaming rules to form a complete set of lottery tickets.

Figure 3:
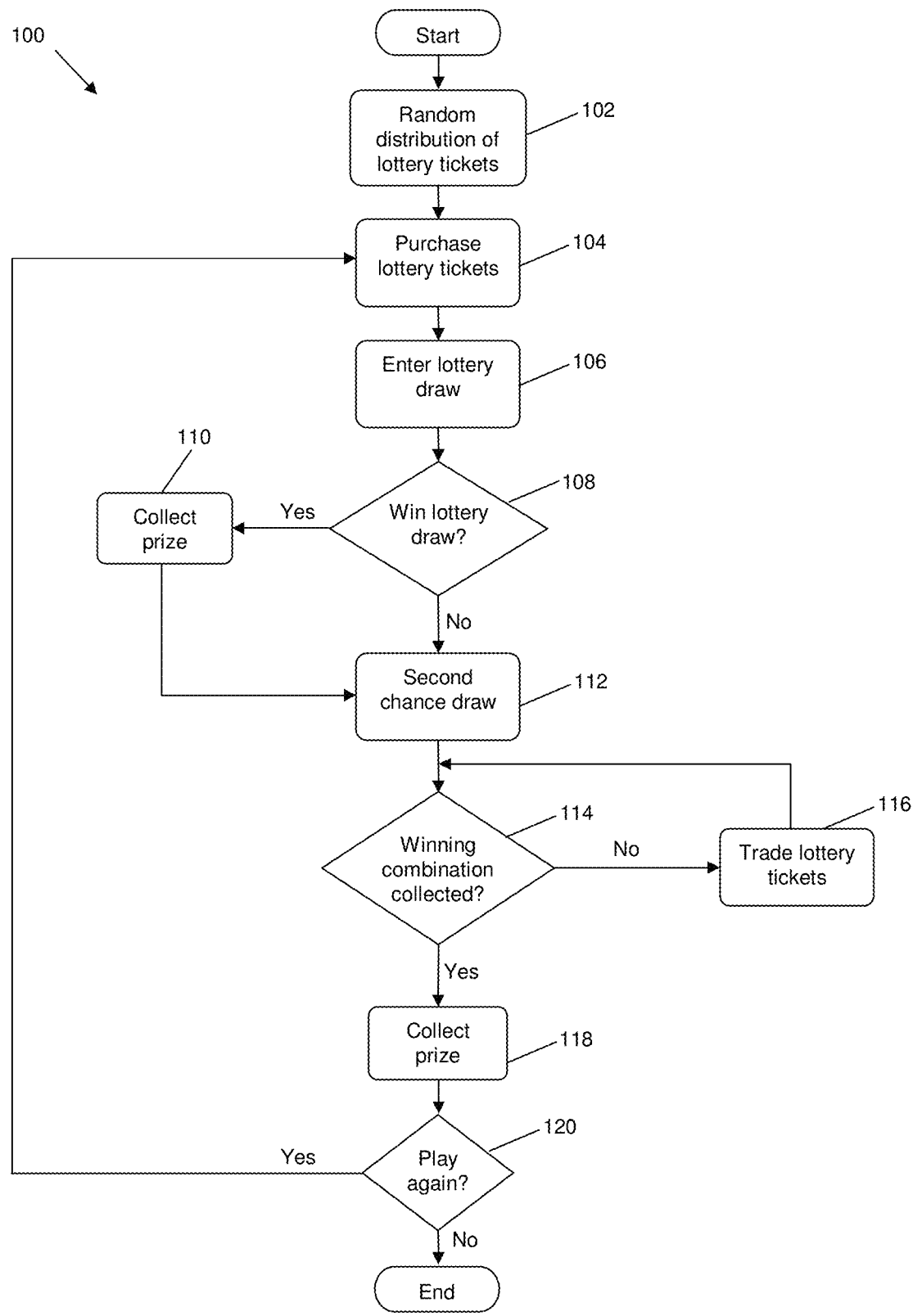
FIG. 3 is a flowchart illustrating a gaming method using the lottery tickets described in FIGS. 1A to 2C in accordance with an embodiment of the present invention.

The method 100 for playing a game using the lottery tickets described above with reference to FIGS. 1A to 2C will now be described with reference to FIG. 3.

At step 102, lottery tickets 10 with randomly printed images (i.e. 14) on a rear face are distributed to different sales outlets such as convenience stores, supermarkets and newsagents.

At step 104, a player purchases one or more lottery tickets 10 to participate in a lottery draw.

At step 106, the player chooses a selection of numbers from a grid of available numbers 12 on each lottery ticket 10 (FIG. 1A) and gives the tickets 10 to a lottery operator for lodgments in the lottery draw. The lottery operator then returns the lottery tickets 10 to the player for participation in the second chance prize draw, which will be described in more detail below.

At query step 108, the winning lottery numbers are drawn and the player compares the selected numbers on his one or more lottery tickets 10 to determine whether he is eligible to claim one or more prizes. If the player is eligible to claim one or more prizes, the method 100 proceeds to step 110. Alternatively, if the player is not eligible to claim any prizes, the method 100 proceeds to step 112.

At step 110, the player claims one or more prizes if the player is eligible based on the selected numbers on his one or more lottery tickets 10. Once the player has claimed his one or more prizes, the method 100 also proceeds to step 112.

At step 112, the player retains his lottery tickets 10 to participate in a second chance prize draw. In the second chance prize draw, the player is notified of a winning combination of lottery tickets for collection to claim a prize. Elaborating further, the notification may be published online or in newspapers and magazines. The notification may also be sent via email, SMS messaging, push notification or some other electronic means. The same winning combination of lottery tickets may be advertised for all players. Alternatively, different winning combinations may be advertised for different players, or different groups of players, for example, different groups of players in different locations. In one embodiment, the player is notified of one winning combination of lottery tickets for each lottery draw. In another embodiment, the player is notified of one winning combination of lottery tickets for a predetermined number of lottery draws, or for a predetermined time period so that lottery tickets from different lottery draws may be collected to for a winning combination. In a further embodiment, the player may be eligible to claim a further prize if the player has collected more than a predetermined number of sets of winning lottery ticket combinations (consecutively or otherwise).

At query step 114, the player compares the images on his lottery tickets to determine whether he has a winning combination of lottery tickets. If the player has the winning combination of lottery tickets, the method 100 proceeds to step 118. Alternatively, if the player needs to collect other lottery tickets to obtain the winning combination of lottery tickets, the method 100 proceeds to step 116.

At step 116, the player contacts other players to trade lottery tickets in view of obtaining the winning combination of lottery tickets. Once the player has collected the required lottery tickets to form the winning combination, the method 100 proceeds to step 118.

At step 118, the player claims his prize for his winning combination of lottery tickets. In one embodiment, the winning combination of lottery tickets may be returned to the sales outlet when collecting the prize. In another embodiment, the winning combination of lottery tickets may be retained by the player for participation in a further prize draw to collect a larger winning combination of lottery tickets.

At query step 120, the player decides whether he wishes to play again. If so, the method 100 proceeds to step 104 in which the player purchases one or more lottery tickets 10 for the next lottery draw.

Accordingly, the lottery tickets (i.e. 10) are associated with one another by the gaming rules of the second chance prize draw. As described above, if the player collects all lottery tickets according to the rules of the second chance prize draw to obtain a winning combination of lottery tickets, the player would be eligible to claim a second chance draw prize. However, if the player does not collect all necessary lottery tickets to obtain a winning combination of lottery tickets, then the player would not be eligible to claim any second chance draw prize. The lottery tickets (i.e. 10) of the present invention therefore have a working inter-relationship with one another.

Figure 4:
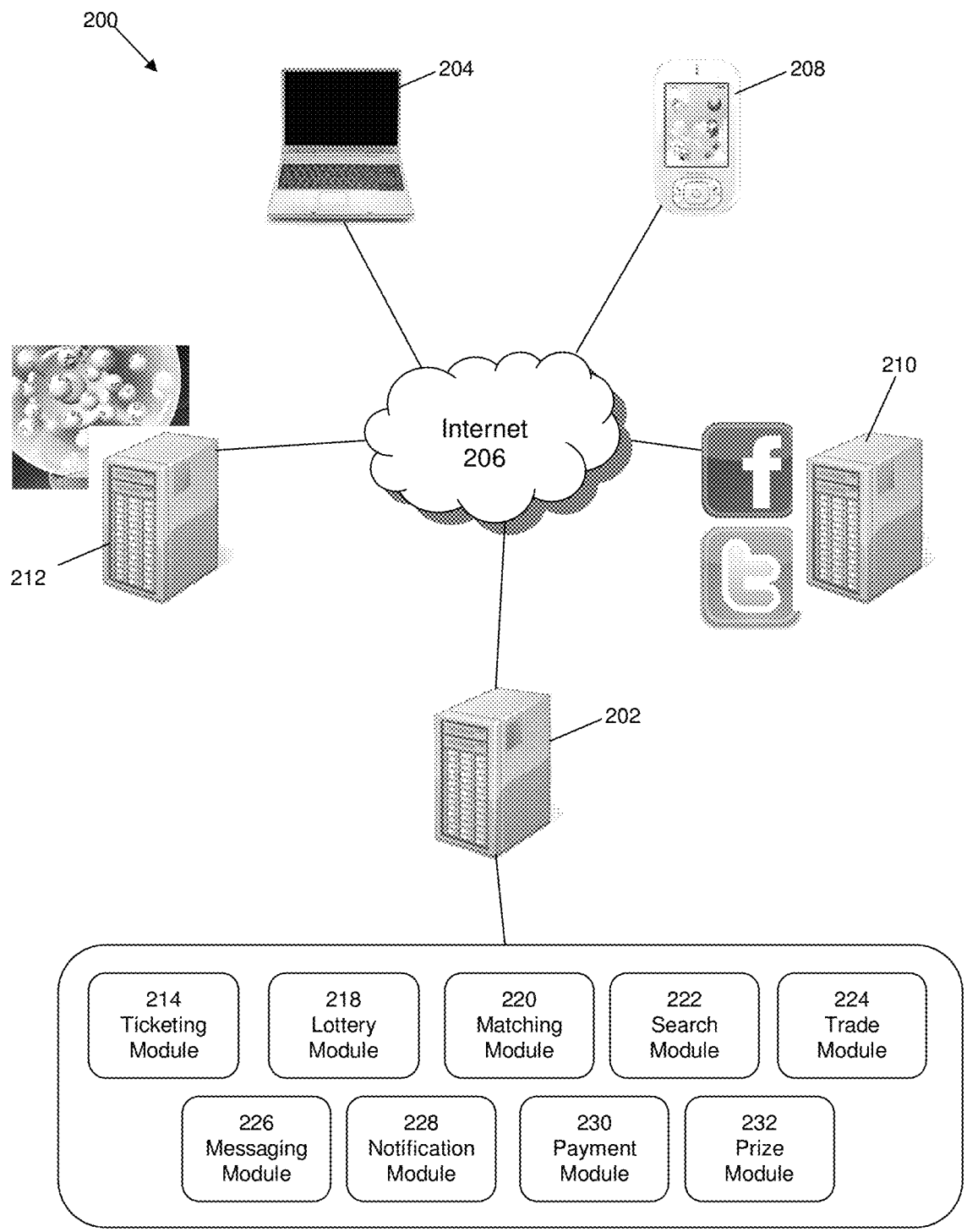
FIG. 4 is a block diagram of a gaming system in accordance with an embodiment of the present invention.

FIG. 4 illustrates a gaming system 200 in accordance with an embodiment of the present invention. The gaming system 200 includes a game control server 202 that executes a software product (being machine readable instructions) and hosts a gaming website by which users can set up accounts and register as players to enter prize draws online.

The system 200 includes a player's home PC or laptop 204 for accessing the gaming website over the Internet 206. The system 200 also includes a player's mobile internet device such as a smart phone 208 for accessing the gaming website over the Internet 206.

The system 100 further includes social networking server 210 for hosting a social networking website (e.g. Facebook, Twitter, etc.). The game control server 202 may post notifications and allow players to make posts or send messages to each other and other potential players via the social networking server 210. The game control server 202 may also send invitations on social networking websites on behalf of the players to invite other social network users to join the game.

The system 200 also includes a lottery server 212 typically administered by a lottery provider (e.g. New York Lottery, the Tatts Group, etc.) conducting a lottery. The players purchase lottery tickets for a lottery draw via the gaming website. The lottery ticket includes a selected subset of numbers that are compared to the winning lottery numbers of the draw to determine a win.

The game control server 202 includes a ticketing module 214 for generating virtual lottery tickets in a player's account. Each lottery ticket includes a random matching identifier in the form of an image for matching with images of one or more other lottery tickets to form a winning combination of lottery tickets.

The game control server 202 further includes a lottery module 218 for determining whether one or more lottery tickets purchased by the player are winning lottery tickets based on the numbers selected by the player.

The game control server 202 further includes a matching module 220 for determining whether the player has a winning combination of lottery tickets based on the image of each lottery ticket collected by the player. The matching module 220 may determine that there is a winning combination of lottery tickets in accordance with any one of the examples previously described with reference to FIGS. 2A to 2C.

The game control server 202 further includes a search module 222 for enabling the player to search for one or more lottery tickets that the player wishes to collect. The search module 222 may search other player's lottery tickets for the one or more lottery tickets that the player wishes to collect. The search module 222 may locate the one or more lottery tickets that the player wishes to collect and their respective owners. Once the search module completes a search, the game control server 202 may prompt the player to contact the one or more owners to initiate trading of lottery tickets.

The game control server 202 further includes a trading module 224 for enabling different players to trade their lottery tickets.

The game control server 202 further includes a messaging module 226 for enabling the player to send messages to other players or potential players. The messages may be email or SMS messages. The messaging module 202 may further allow the player to post messages via the social networking server 210 on social media websites. In particular, the messaging module 226 may allow the player to post messages offering a trading of lottery tickets. For example, the messaging module 226 may allow the player to post a message including the lottery tickets that the player wishes to collect and the lottery tickets that the player wishes to trade.

The game control server 202 further includes a notifications module 228 for sending notifications to the player. For example, the notifications module 228 may notify the player of a winning combination of lottery cards, cards which the player must collect to form the winning combination, when a card that the player wishes to collect has been found, when another player has accepted a trade, when a trade of one or more lottery tickets between the player and one or more other players has been completed, and when the player strikes a win.

The game control server 202 further includes a payment module 230 for receiving and processing payment from the player, and a prize module 232 for allocating a prize to the player for a win. The prize module 232 may allocate prize money to the player's account.

Figure 5:
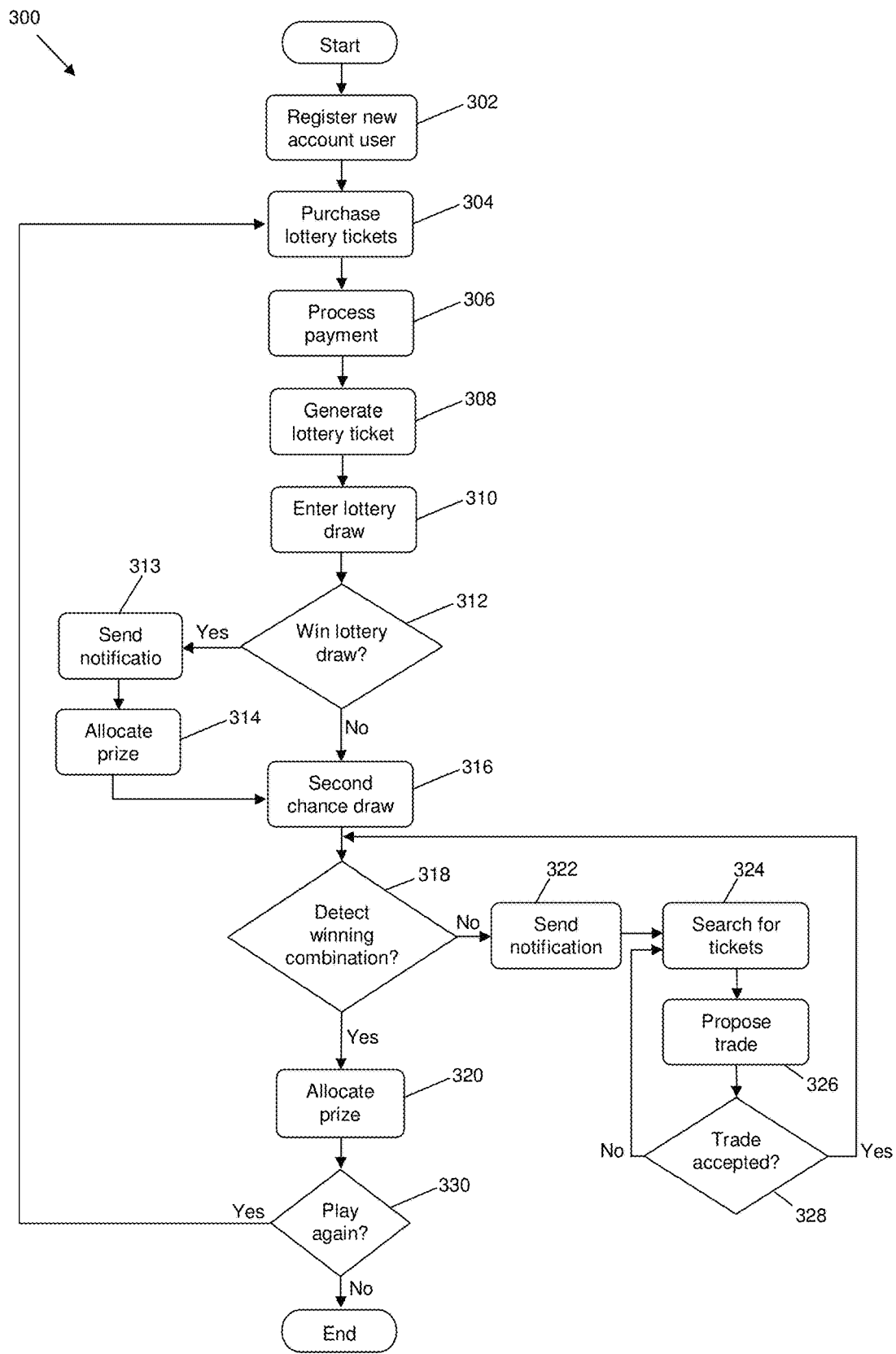
FIG. 5 is a flowchart illustrating an online gaming method performed by the gaming system of FIG. 4 and in accordance with an embodiment of the present invention.

The online gaming method 300 performed with the gaming system 200 is now described with reference to FIG. 5.

At step 302, the game control server 202 receives registration details from the user's computer 204. In this step, a new user sets up a new user account and registers as a player via the gaming website hosted by the game control server 202. Information entered by the new player is saved on a user database (not shown) on the game control server 202.

At step 304, the game control server 202 enables the player to purchase lottery tickets via the gaming website. The player chooses a selection of numbers for each lottery ticket for lodgment in a lottery draw.

At step 306, the payment module 230 of the game control server 202 prompts for and receives payment from the player for the lottery tickets purchased in step 304. The payment module 230 may accept payment in a variety of ways. For example, the payment module 230 may accept credit or debit card payment, payment via BPAY, online banking or the like. Alternatively, an existing player may have existing account credit, or previous prize monies, which can be used for the payment of the lottery tickets.

At step 308, the ticketing module 214 of the game control server 202 generates the virtual lottery tickets, which are accessible by the player from his account. Each ticket displays the numbers selected by the player for participation in the lottery draw and an image (e.g. 14) randomly selected from a predetermined range of images.

At step 310, the lottery module 218 of the game control server 202 communicates with the lottery server 212 via the Internet 206 to lodge the numbers selected by the player in the lottery draw.

At step 312, the lottery module 218 of the game control server 202 receives the winning lottery numbers from the lottery server 212 and compares the winning lottery numbers with the numbers selected by the player. After the comparison, the lottery module 218 determines whether one or more lottery tickets purchased by the player are winning lottery tickets. If one or more winning lottery tickets are detected, the method 300 proceeds to step 313. Alternatively, if no winning lottery tickets are detected, the method 300 proceeds to step 316.

At step 313, the notifications module 228 of the game control server 202 sends a congratulatory message and informs the player of the prize (i.e. the amount of prize money) that he has won. The congratulatory message may also prompt the player to redeem his prize.

At step 314, the prize module 232 of the game control server 202 claims the prize money on behalf of the player via communication with the lottery server 212 and allocates the prize money into the player's account. The player can transfer the money into his personal bank account or retain all or a portion of the prize money on his gaming account to purchase more lottery tickets in the next draw.

At step 316, the online gaming method 300 allows the player to use his previously purchased and stored lottery tickets in a second chance prize draw. To initiate the second chance prize draw, the notification module 228 of the game control server 202 sends a message to the player notifying him of the winning combination of lottery tickets for collection to participate in the second chance prize draw. The message may be sent to an inbox or a message page on the player's account. The notification may also be sent via email or SMS messaging to the player's personal PC or laptop 204 or smart phone 208. Similar to gaming method 100, different winning combinations may be sent to different players. Alternatively, the same winning combination of lottery tickets may be advertised, for example on the gaming website, for all players.

At step 318, the matching module 220 of the game control server 202 compares the images on the player's lottery tickets to determine whether he has the winning combination of lottery tickets. If the player has the winning combination of lottery tickets, the method 200 proceeds to step 320. Alternatively, if the player needs to collect other lottery tickets to obtain the winning combination of lottery tickets, the method 200 proceeds to step 322.

At step 322, the notification module 228 of the game control server 202 may send a notification to the player notifying the player of the lottery tickets that the player must collect to obtain the winning combination.

At step 324, search module 222 of the game control server 202 allows the player to search for the lottery tickets that he wishes to collect and identify the players that hold those lottery tickets.

At step 326, the messaging module 226 of the game control server 202 allows the player to contact other players to propose trades for lottery tickets that the player wishes to collect. Other players may also use the messaging module 226 to make counter-offers and negotiate trades. The messaging module 226 may make posts or send messages via the social networking server 210.

At query step 328, if a proposed trade is accepted between two players, the trade module 224 conducts the trade of lottery tickets between the player accounts and the method 300 returns to step 318. If the proposed trade is rejected, the method returns to step 324 and the player may wish to use the search module 220 to search for other players to trade with.

At step 320, the prize module allocates a prize to the player's account in the same manner as the process in step 314.

At step 330, the player decides whether he wishes to play again. If so, the method 200 proceeds to step 304 in which the player purchases one or more lottery tickets for the next lottery draw.

In the present specification and claims (if any), the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

In one alternative embodiment, the player can only participate in the second chance prize draw if the player was not eligible to claim any prizes from the lottery draw.

In another alternative embodiment of the online gaming method 300, if the prize allocated at steps 314 and 320 is not in the form of money (i.e. a car or holiday), the notification module 228 will send information regarding the prize, such as how to redeem the prize, to the player.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

The invention claimed is:

1. A gaming system comprising:
   at least one server comprising machine readable instructions including:
      a ticketing module for providing a lottery ticket for participation in a lottery draw, the lottery ticket comprising:
         a body including:
            at least one edge;
            indicia, in the form of a plurality of numbers, for selection by a player to participate in the lottery draw; and
            a matching identifier, in the form of a first portion of a complete and isolated image for matching with another identifier in the form of a second portion of the image of one or more other lottery tickets, associated with a second chance draw, the first portion of the image including at least one edge that overlaps at least a portion of the at least one edge of the body, the at least one edge of the first portion of the image being alignable with at least one corresponding edge of the second portion of the image of at least the one or more other lottery tickets to form the complete and isolated image;
      wherein the complete and isolated image forms a winning combination of tickets, and
      wherein the lottery ticket and the one or more other lottery tickets form a further winning combination that is associated with a further prize draw, the further prize draw being distinct from the lottery draw and the second chance draw;
      a trading module for enabling different players to trade lottery tickets; and
      a notifications module for sending notifications to the player, the notifications module being configured to notify the player of when a lottery ticket that the player wishes to collect has been found, when another player has accepted a trade, and when a trade of one or more lottery tickets between the player and one or more other players has been completed.

2. The system as claimed in claim 1, wherein the ticketing module generates a digital representation of a lottery ticket suitable for display on a desktop or handheld computer.

3. The system as claimed in claim 1, wherein the machine readable instructions further comprise a lottery module for determining whether the lottery ticket is a winning lottery ticket based on a plurality of numbers selected by the player.

4. The system as claimed in claim 1, wherein the machine readable instructions further comprise a matching module for determining whether the player has a winning combination of lottery tickets based on the matching identifier of each lottery ticket collected by the player.

5. The system as claimed in claim 4, wherein the matching module determines that there is a winning combination of lottery tickets if the respective identifiers of lottery tickets collected by the player meet a one or more predetermined criteria.

6. The system as claimed in claim 4, wherein the matching module determines that there is a winning combination of lottery tickets if a predetermined number of lottery tickets including the same identifier are collected by the player.

7. The system as claimed in claim 4, wherein the matching module determines that there is a winning combination of lottery tickets if the respective identifiers of lottery tickets collected by the player can be pieced together to form a complete image.

8. The system as claimed in claim 1, wherein the machine readable instructions further comprise a search module for enabling the player to search for one or more lottery tickets that the player wishes to collect.

9. The system as claimed in claim 8, wherein the search module searches other player's lottery tickets for the one or more lottery tickets that the player wishes to collect.

10. The system as claimed in claim 8, wherein the search module locates the one or more lottery tickets that the player wishes to collect and their respective owners.

11. The system as claimed in claim 1, wherein the notifications module being further configured to notify the player of any one or more of the following: a winning combination of lottery tickets which the player must collect to form the winning combination, and when the player strikes a win.

* * * * *